United States Patent
Bohlman et al.

(10) Patent No.: US 8,074,361 B2
(45) Date of Patent: Dec. 13, 2011

(54) ROSE PRUNING AND STRIPPING DEVICE

(76) Inventors: Barbara E. Bohlman, Sherman Oaks, CA (US); Camille B. Carr, Sherman Oaks, CA (US)

( * ) Notice: Subject to any disclaimer, the term of this patent is extended or adjusted under 35 U.S.C. 154(b) by 1058 days.

(21) Appl. No.: 11/467,823

(22) Filed: Aug. 28, 2006

(65) Prior Publication Data

US 2007/0044316 A1    Mar. 1, 2007

Related U.S. Application Data

(60) Provisional application No. 60/714,162, filed on Sep. 1, 2005.

(51) Int. Cl.
 *B26B 13/00*    (2006.01)
(52) U.S. Cl. .......... 30/134; 30/135; 30/254; 30/258; 30/261; 30/262; 30/271; 30/123
(58) Field of Classification Search .......... 30/134, 30/135, 254, 261, 262, 271, 123.3, 123, 258
 See application file for complete search history.

(56) References Cited

U.S. PATENT DOCUMENTS

| | | | |
|---|---|---|---|
| 131,108 A | 9/1872 | McElhaney | |
| 216,571 A * | 6/1879 | Lytle | 30/258 |
| 348,357 A * | 8/1886 | Stark | 30/135 |
| 1,322,085 A | 11/1919 | Bertrand | |
| 1,359,148 A * | 11/1920 | Bertrand | 30/134 |
| 1,595,706 A * | 8/1926 | Carlson | 86/22 |
| 1,758,781 A * | 5/1930 | Burger et al. | 30/250 |
| 2,086,081 A * | 7/1937 | Hollenbeck | 30/134 |
| 2,406,670 A * | 8/1946 | Delgado | 30/252 |
| 2,674,796 A * | 4/1954 | Herold | 30/262 |
| 2,708,311 A * | 5/1955 | McCloud | 30/120 |
| 3,733,627 A * | 5/1973 | Epstein | 7/108 |
| 4,037,276 A * | 7/1977 | Brinker | 7/135 |
| 4,226,145 A * | 10/1980 | Gill | 30/90.1 |
| 4,268,963 A | 5/1981 | Harrison | |
| 4,333,235 A * | 6/1982 | Howard | 30/259 |
| 5,170,559 A | 12/1992 | Orthey et al. | |
| 5,561,904 A * | 10/1996 | Chung | 30/234 |
| D393,189 S | 4/1998 | Spear et al. | |
| 5,787,589 A * | 8/1998 | Auderset | 30/261 |
| 6,418,626 B1 | 7/2002 | Jang | |
| D472,433 S | 4/2003 | Richwine et al. | |
| D476,199 S | 6/2003 | Richwine et al. | |
| 6,594,909 B2 * | 7/2003 | Deville | 30/341 |
| 6,634,105 B2 | 10/2003 | Lindermeir | |
| D496,837 S | 10/2004 | Tomchak et al. | |
| 2005/0198832 A1 | 9/2005 | Hsien | |
| 2005/0268467 A1 * | 12/2005 | Woods-Hunter | 30/90.4 |

FOREIGN PATENT DOCUMENTS

GB    2354473 A    3/2001

* cited by examiner

*Primary Examiner* — Robert Scruggs
(74) *Attorney, Agent, or Firm* — Kelly Lowry & Kelley, LLP

(57) ABSTRACT

A rose pruning and stripping device includes first and second jaws pivotally connected between handle and cutting portions thereof. An inner edge of the cutting portion of the first jaw sharpened into a cutting edge, and the opposite inner edge of the cutting portion of the second jaw defines a dull edge. A multi-faceted notch is formed in each cutting portion of the first and second jaws between the pivotal connection and the sharpened edge. A leaf and thorn stripping aperture is formed as the handles of the first and second jaws, and particularly the cutting portions thereof, are brought towards one another.

20 Claims, 4 Drawing Sheets

ROSE PRUNING AND STRIPPING DEVICE

BACKGROUND OF THE INVENTION

The present invention generally relates to trimming and cutting devices, such as shears and pruners. More particularly, the present invention relates to a rose pruning and stripping device, wherein leaves, small stems, and thorns can be quickly and easily removed from the larger stem of the flower, such as a rose.

When making a floral presentation, leaves on a lower portion of the stem of a flower are typically removed, so as to avoid water degradation. It is known that the leaves, if allowed to be submerged in the water, degrade over time resulting in bacterial contamination of the water. Moreover, aside from making a flower arrangement in a vase full of water, it is often desirable and aesthetically pleasing to have the lower leaves removed.

This is particularly the case with roses, such as long stem roses and the like. When purchasing roses, the lower leaves and thorns typically have already been removed. This is to provide the benefits described above, and give the bouquet of roses an aesthetically pleasing appearance. Home gardeners who cut roses from their own bushes oftentimes remove the small stems, leaves, and thorns for the same purposes. Of course, with roses, the thorns are not only aesthetically displeasing, but are dangerous to those handling the roses. The thorns can easily puncture the skin, sometimes resulting in infection. Thus, when preparing the roses for display and/or sale, these are removed. However, the removal of such leaves, stems and thorns is very complicated and time consuming. Typically, a small knife or a pair of scissors is used to individually remove the thorns and leaves. This can still easily lead to punctures of the skin while handling the rose to remove the leaves and thorns.

There do exist devices configured to serve as strippers. For example, there are wire cutters and strippers, wherein the handle portion contains one or more apertures of relatively small size configured to cut into the insulation sheath of a wire and remove the insulation sheath so as to expose the metal wire. Some of the apertures are actually intended to cut a cable or wire. For example, United States Patent Application Publication U.S. 2005/0198832A1 to Chin-Ching Hsien discloses a multi-functional engineering clipper. This clipper includes a set of jaws which can cut metal, and two apertures formed when the handles are brought towards one another for stripping or cutting cables, wires and the like. However, this device, and others like it, do not lend themselves to pruning and stripping roses, as described above. For example, the Hsien publication discloses a relatively large tool that requires two hands to operate and is designed to cut relatively large cables. Even single-handed wire clippers would not function well in pruning or stripping roses. This is due to the fact that the blades are typically not pruning blades, but rather adapted to cut metal wire. Moreover, the apertures are typically circular and of relatively small dimension which could damage, and even cut, the rose stem.

U.S. Pat. No. 2,086,081 to Hollenbeck discloses garden shears having notches formed in each jaw so as to form a generally circular aperture when brought towards one another. However, the aperture of these garden shears is intended and designed to facilitate the cutting of comparatively large plants. U.S. Pat. No. 1,322,085 to Bertrand discloses a flower shears and stripper. However, the flower shears include relatively flat blades, similar to a pair of scissors, which are not ideal for pruning or shearing. Moreover, the stripping aperture is formed at the end of the device, either by means of an attachment, or forming of notches at the very end of the cutting jaws. This aperture is generally circular. It has been found by the present inventor that the placement of the stripping aperture at the end of the jaws makes it difficult to control the stripping of the leaves and thorns from the flower. Moreover, a circular aperture can damage the flower stem, and in some cases inadvertently cut the flower stem.

Accordingly, there is a continuing need for a device for not only trimming or pruning roses, but also easily stripping the thorns and leaves from the lower portion of the flower stem. The present invention fulfills these needs and provides other related advantages.

SUMMARY OF THE INVENTION

The present invention resides in a rose pruning and stripping device which overcomes the complications discussed above. The device generally comprises a first jaw having a handle portion at one end thereof and a cutting portion at a generally opposite end thereof. A second jaw having a handle portion at one end thereof and a cutting portion at a generally opposite end thereof is pivotally connected to the first jaw between the handle and cutting portions. A multi-faceted notch is formed in each cutting portion of the first and second jaws, typically above the pivotal connection, whereby a leaf and thorn stripping aperture is formed as the handles of the first and second jaws are brought towards one another. When positioned over the stem of the rose, the device can be used to quickly and easily strip away the leaves and thorns in a pulling motion, as will be described more fully herein.

An inner edge of the cutting portion of the first jaw is sharpened into a cutting edge. This edge typically defines a generally convex curve. The opposite inner edge of the cutting portion of the second jaw defines a dull ledge. Typically, this inner edge of the cutting portion of the second jaw defines a generally concave curve. The cutting portions of the first and second jaws, when closed, at least partially overlap with one another.

In a particularly preferred embodiment, the multi-faceted notch formed in the first and second jaws comprises a two-faceted notch, whereby a generally diamond-shaped stripping aperture is created as the cutting portions of the first and second jaws are brought towards one another. The multi-faceted notches have dull exposed edges. Preferably, the multi-faceted notches' exposed edges are rounded. Typically, the notches are formed in the cutting portion of the first and second jaws between the pivotal connection and the sharpened cutting edge.

A stop is preferably disposed between the handle portions of the first and second jaws so as to prevent full closure of the stripping aperture. The handle portions of the first and second jaws are typically biased away from one another. A locking mechanism is used to selectively lock the handle portions adjacent to one another, such that the cutting portions are in a closed position.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawing illustrates the invention. In such drawings.

DETAILED DESCRIPTION OF THE PREFERRED EMBODIMENTS

Figure 1:
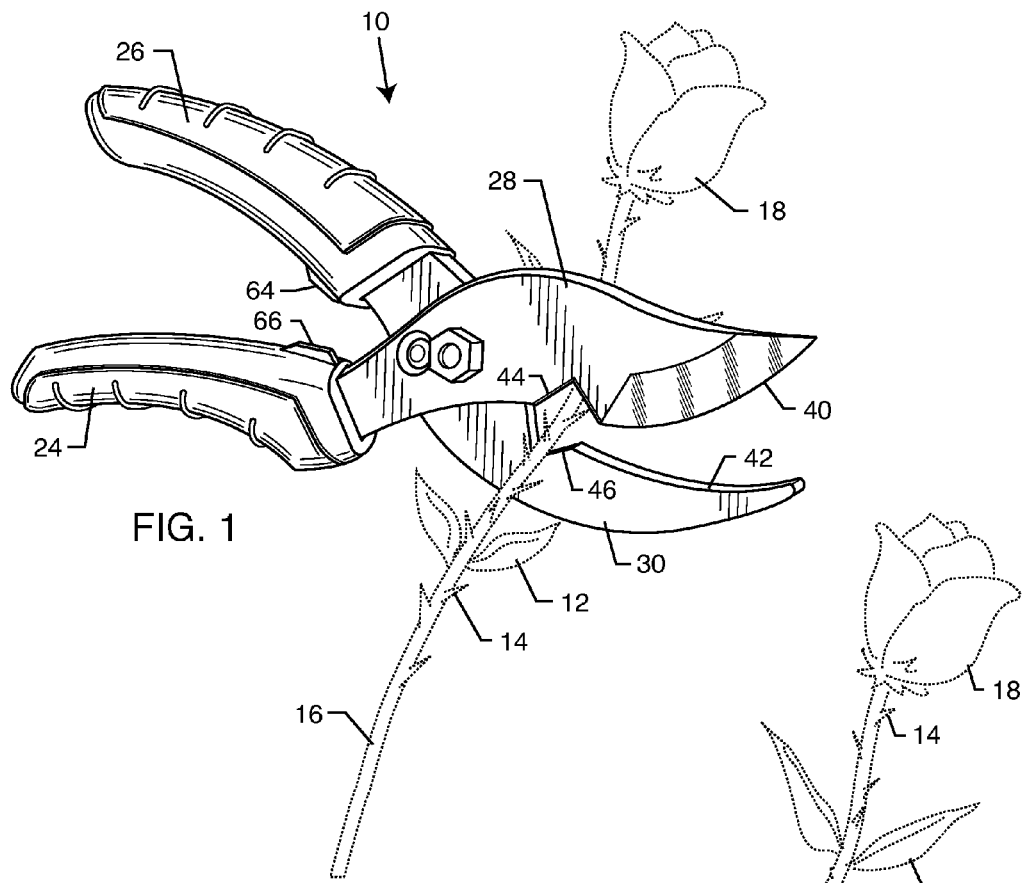
FIG. 1 is a perspective view illustrating a pruning and stripping device embodying the present invention, and being inserted over a stem of a rose.
Figure 2:
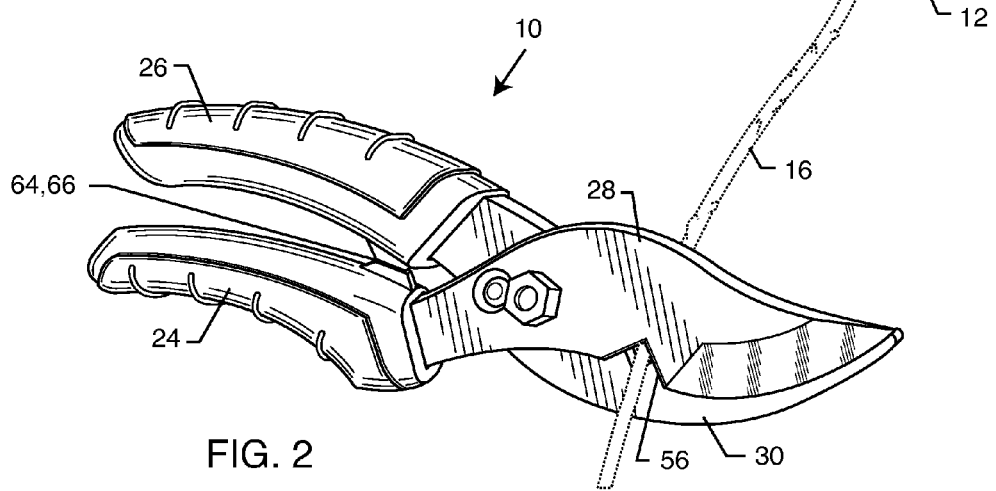
FIG. 2 is a perspective view similar to FIG. 1, illustrating the pruning and stripping device used to strip leaves and thorns from the rose stem, in accordance with the present invention.

As shown in the accompanying drawings, for purposes of illustration, the present invention resides in a pruning and stripping device, generally referred to by the reference number 10. As shown in FIGS. 1 and 2, the device 10 of the present invention is designed and configured to not only serve as a pruning device or shears, and thus cut stems from a plant, such as a rosebush, but also is configured so as to easily and effectively remove and strip leaves 12 and thorns 14 from a stem 16 of a flower 18, such as a rose.

Figure 7:
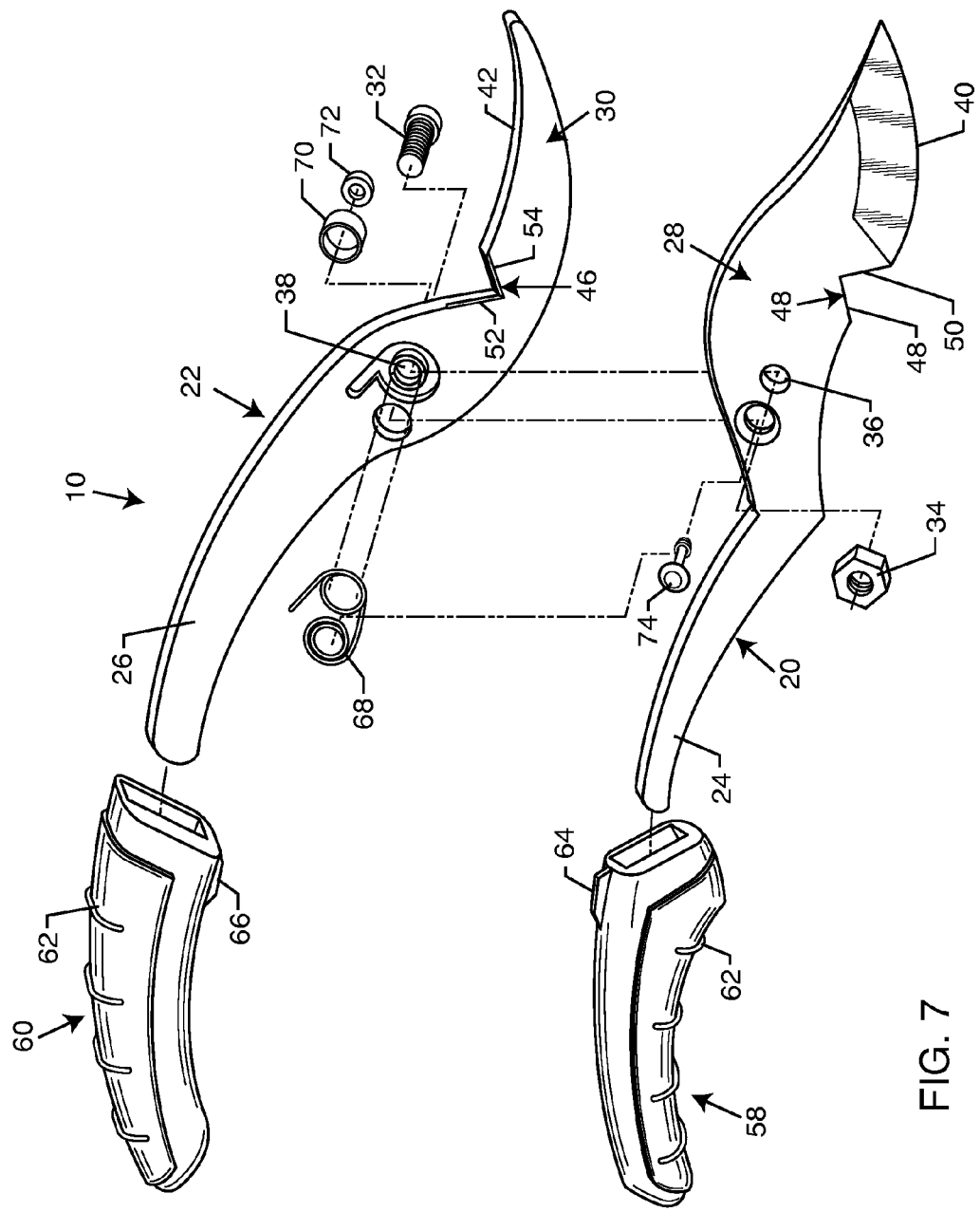
FIG. 7 is an exploded perspective view of the pruning and stripping device of the present invention.

With reference now to FIG. 7, the present invention generally comprises first and second jaws 20 and 22 which are pivotally connected to one another so as to be movable relative to one another. Each jaw 20 and 22 includes a handle portion 24 and 26 at one end thereof, and a cutting portion 28 and 30, respectively, at an opposite end thereof. The jaws 20 and 22 are pivotally connected between the handle portions 24 and 26 and the cutting portions 28 and 30, such as by means of a pivot pin or bolt 32 secured in place by means of a nut 34, or any other acceptable pivotally securing means. Each jaw 20 and 22 includes an aperture 36 and 38 through which the pivoting pin or bolt 32 extends.

An inner edge 40 of the first jaw 20 is sharpened so as to create an effective cutting edge capable of cutting plant material, such as rose stems and the like. For optimal effectiveness, the cutting edge 40 is of a generally convex curvature. This can create a clean cut without crushing the plan stem 16.

Figure 3:
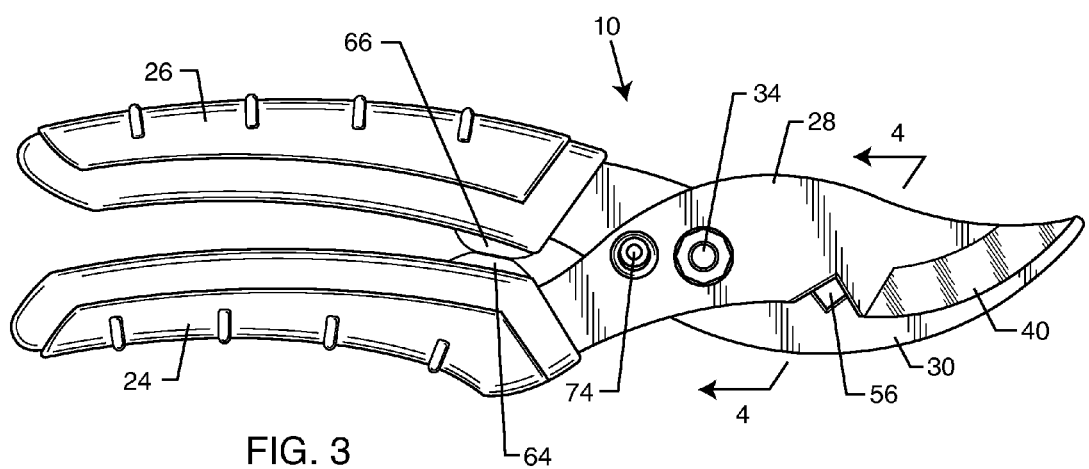
FIG. 3 is a bottom plan view of the trimming and stripping device of the present invention.
Figure 5:
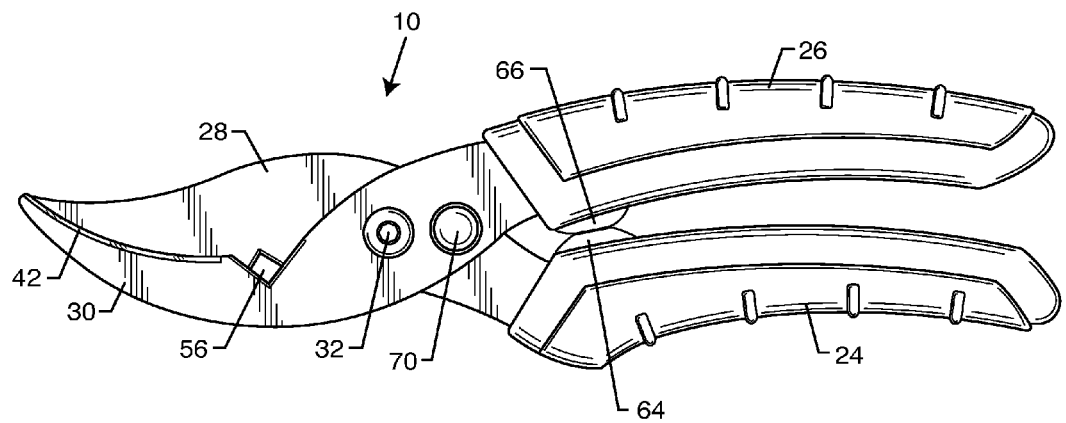
FIG. 5 is a top plan view of the pruning and stripping device.
Figure 6:
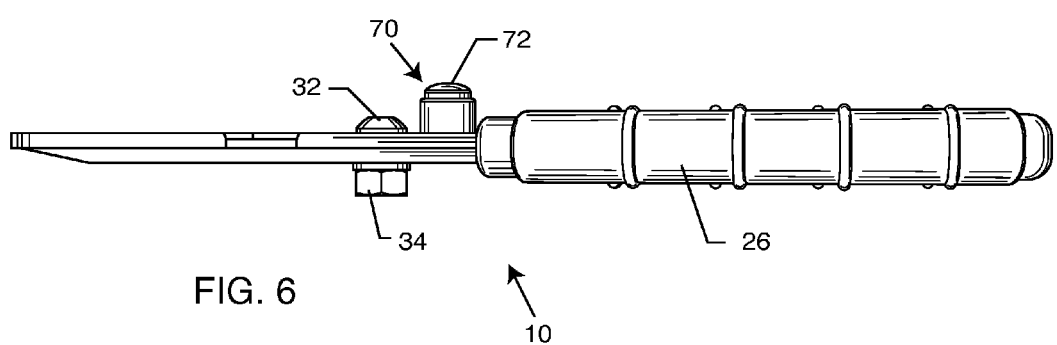
FIG. 6 is a side elevational view of the pruning and stripping device of the present invention.

The inner edge 42 of the second jaw 22 defines a flat or dull ledge. This ledge 42 is typically a generally concave curve, and is adapted to stabilize and hold the plant stem 16. The inner edges 40 and 42 cooperatively hold and cut plan stems and the like and effectively serve as a pruning and shearing device. As can be seen in FIGS. 3 and 5, the cutting portions 28 and 30 of the first and second jaws 20 and 22 partially overlap with one another when brought into the closed position. That is, cutting edge 40 slides past ledge 42.

Notches 44 and 46 are formed, respectively, in the jaws 20 and 22. These notches 44 and 46, as described above, cooperatively form a stripping aperture through which the stem 16 of the flower 18 is inserted. The stripping aperture is used to strip and remove leaves 12 and thorns 14 from the flower 18. It has been found that a circular aperture presents several drawbacks, including the possibility that the circular aperture is either too small for the stem, and thus severs the stem when closed, or too large in diameter such that the thorns and leaves are not effectively removed. Accordingly, notch 44 is a multi-faceted notch, and in a particularly preferred embodiment includes first and second facets 48 and 50 which are angled with respect to one another. Similarly, notch 46 is defined by facets 52 and 54 which are angled with respect to one another. It will be appreciated by those skilled in the art that the number of facets could be increased. However, two facets defining each notch 44 and 46 to create a generally diamond-shaped stripping aperture 56 has been found to effectively remove leaves 12 and thorns 14 from a plant stem 16, without damaging or cutting the stem 16. Just as cutting edges 40 and 42 slide past one another in overlapping relationship, notches 44 and 46 are configured to slide past one another so as to create an aperture 56 that can be quite large when the cutting portions 28 and 30 are away from one another, as illustrated in FIG. 1, and quite small when the cutting portions are overlapped with one another, as illustrated in FIG. 2. As will be more fully described herein, the device 10 preferably includes a stop so as to limit the size of the stripping aperture 56 such that it is not completely closed and will not sever the flower stem 16.

Figure 4:
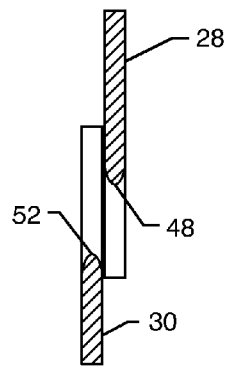
FIG. 4 is a cross-sectional view taken generally along line 4-4 of FIG. 3, illustrating a leaf and thorn stripping aperture of the device of the present invention.

With reference now to FIG. 4, to further prevent damage to the stem 16 of the flower 18, the exposed surfaces or edges of the notches 44 and 46 are dull so as not to cut into the stem 16, yet still effectively strips the small stems, leaves 12 and thorns 14 from the flower 18. In a particularly preferred embodiment, as illustrated in FIG. 4, the exposed edges of the facets 48-54 are rounded to accomplish these purposes.

With reference again to FIG. 7, the notches 44 and 46 are preferably located between the handle portions 24 and 26 and cutting portions 28 and 30 of jaws 20 and 22. More particularly, it has been found that if the stripping aperture 56 is formed adjacent to the handle grips 24 and 26, there exists the possibility that the leaves and thorns can come into contact with the user's hand. Forming the stripping aperture 56 towards the end of the cutting portions 28 and 30 renders control of the stripping of the leaves and thorns from the stem 16 difficult and awkward. However, positioning the notches 44 and 46 between the pivot pin or bolt 32 and the cutting edge 40 places the stem 16 a sufficient distance away from the handles 24 and 26 to avoid contact with the thorns 14 and leaves 12, yet gives a great degree of control to the user in stripping the thorns and leaves 14 and 12 from the stem 16. This could be due to the fact that the aperture 56 is formed at approximately the mid-point or balancing point of the device 10.

With reference again to FIG. 7, in a particularly preferred embodiment, handle grip portions 24 and 26 are curved so as to conform to the user's hand. That is, the first jaw 20 has a handle portion 24 which is curved generally upwardly so as to be easily engaged by the fingers of the user. The handle portion 26 of the second jaw 22 is also curved upwardly so as to fit into the palm and thumb pad of the user. This creates a very natural and comfortable feel in the user's hand.

To increase the comfort to the user, cushioned grips 58 and 60 are formed or adhered onto the handle portions 24 and 26. The grips 58 and 60 are typically comprised of an elastomeric or rubber-type material so as to provide a frictional grip, even in wet conditions. Spaced apart projections 62 on the grips 58 and 60 further increase the grippable effect of the handles 24 and 26.

As mentioned above, preferably the device 10 includes a stop to prevent the stripping aperture 56 from closing. In a particularly preferred embodiment, gripping portions 58 and 60 include internal projection stops 64 and 66 which are generally aligned with one another so as to come into contact with one another when the handles 24 and 26 are brought towards one another, thus closing cutting portions 28 and 30, as well as stripping aperture 56.

In a particularly preferred embodiment, the jaws 20 and 22 are biased such that the cutting portions 28 and 30 are open with respect to one another in a relaxed state. This is for the convenience of the gardener such that a plant stem or the like can be easily inserted between the open cutting portions 28 and 30, which are then brought together by squeezing handle portions 24 and 26 to sever the stem 16 between cutting edges 40 and 42, or so as to close stripping aperture 56 over the stem for stripping. Accordingly, a spring 69 is operably disposed between the two jaws 20 and 22 so as to effectively bias the jaws 20 and 22 into an open position as described.

A locking mechanism 70 is used to selectively lock the jaws 20 and 22 in a closed position, as illustrated in FIGS. 3 and 5. This can be accomplished in a variety of ways, but in a particularly preferred embodiment utilizes a push button actuator 72 which selectively locks or unlocks pin 74. Of course, those skilled in the art will appreciate that other locking mechanisms, such as a lever-ratchet mechanism could be utilized.

With reference again to FIGS. 1 and 2, in order to strip the leaves 12 and thorns 14 from a stem 16 of a flower 18, the stem 16 is placed between notches 44 and 46. The notches are closed by squeezing handles 24 and 26 until the rounded exposed edges of the notches 44 and 46 come into contact with the stem 16. The device is then pulled downwardly along the stem, as illustrated in FIG. 2, thus effectively stripping away all small stems, leaves 12 and thorns 14 from the plan stem 16. Thus, the user, with one hand, can hold the flower 18 towards a top end thereof, and use the other hand to operate device 10 as described above to quickly and easily remove the desired leaves 12 and thorns 14 such that the flower, typically a rose 18, is ready for display and arrangement into a bouquet.

Although several embodiments have been described in detail for purposes of illustration, various modifications may be made to each without departing from the scope and spirit of the invention. Accordingly, the invention is not to be limited, except as by the appended claims.

What is claimed is:

1. A rose pruning and stripping device, comprising:
    a first jaw having a handle portion at one end thereof and a cutting portion at a generally opposite end thereof;
    a second jaw having a handle portion at one end thereof and a cutting portion at a generally opposite end thereof, the first and second jaws pivotally connected between the handle and cutting portions; and
    a multi-faceted notch formed in each of the first and second jaws between the pivotal connection and the cutting portion, whereby an aperture adapted to strip leaves and thorns from a stem is formed as the handles of the first and second jaws are brought towards one another;
    wherein facing edges of the multi-faceted notches are configured to be convex so as to not cut or damage the stem from which thorns and leaves are stripped; and
    wherein the notches of the first and second jaws are disposed in different planes so that the notches cooperatively form a variable diameter stripping aperture.

2. The device of claim 1, wherein an inner edge of the cutting portion of the first jaw is sharpened into a cutting edge.

3. The device of claim 2, wherein the inner edge of the cutting portion of the first jaw defines a generally convex curve.

4. The device of claim 2, wherein an opposite inner edge of the cutting portion of the second jaw defines a dull ledge.

5. The device of claim 4, wherein the inner edge of the cutting portion of the second jaw defines a generally concave curve.

6. The device of claim 1, wherein the cutting portions of the first and second jaws, when closed, at least partially overlap with one another.

7. The device of claim 1, wherein the multi-faceted notch formed in the first and second jaws comprises a two-faceted notch, whereby a generally diamond-shaped stripping aperture is created as the cutting portions of the first and second jaws are brought towards one another.

8. The device of claim 1, including a stop disposed between the handle portions of the first and second jaws and configured to permit full closure of the cutting portions of the first and second jaws, but prevent full closure of the stripping aperture.

9. The device of claim 1, wherein the handle portions of the first and second jaws are biased away from one another.

10. The device of claim 9, including a locking mechanism for selectively locking the handle portions adjacent to one another.

11. A rose pruning and stripping device, comprising:
    a first jaw having a handle portion at one end thereof and a cutting portion having a sharpened inner edge at a generally opposite end thereof;
    a second jaw having a handle portion at one end thereof and a cutting portion having a dull ledge inner edge at a generally opposite end thereof, the first and second jaws pivotally connected between the handle and cutting portions whereby the cutting portions of the first and second jaws, when closed, at least partially overlap with one another;
    a multi-faceted notch having beaded exposed edges formed in each cutting portion of the first and second jaws between the sharpened edge and the pivotal connection, whereby an aperture having generally smooth edges adapted to strip leaves and thorns while not cutting a stem is formed as the handles of the first and second jaws are brought towards one another; and
    a stop disposed between the handle portions of the first and second jaws and configured to permit full closure of the cutting portions of the first and second jaws, but prevent full closure of the stripping aperture.

12. The device of claim 11, wherein the inner edge of the cutting portion of the first jaw defines a generally convex curve, and the inner edge of the cutting portion of the second jaw defines a generally concave curve.

13. The device of claim 11, wherein the multi-faceted notch formed in the first and second jaws comprises a two-faceted notch, whereby a generally diamond-shaped stripping aperture is created as the cutting portions of the first and second jaws are brought towards one another.

14. The device of claim 11, wherein the handle portions of the first and second jaws are biased away from one another.

15. The device of claim 14, including a locking mechanism for selectively locking the handle portions adjacent to one another.

16. The device of claim 11, wherein the notches of the first and second jaws are disposed in different planes so that the notches cooperatively form a variable diameter stripping aperture.

17. A rose pruning and stripping device, comprising:
    a first jaw having a handle portion at one end thereof and a cutting portion at a generally opposite end thereof, the cutting portion defining a sharpened inner edge having a generally convex configuration;

a second jaw having a handle portion at one end thereof and a cutting portion at a generally opposite end thereof, an inner edge of the cutting portion defining a dull ledge having a generally convex configuration, the first and second jaws pivotally connected between the handle and cutting portions whereby the cutting portions of the first and second jaws, when closed, at least partially overlap with one another;

a two-faceted notch having beaded exposed edges formed in each cutting portion of the first and second jaws between the sharpened edge and the pivotal connection, whereby a generally diamond-shaped aperture having smooth and non-cutting edges adapted to strip leaves and thorns from a stem is formed as the handles of the first and second jaws are brought towards one another; and a stop disposed between the handle portions of the first and second jaws and configured to permit full closure of the cutting portions of the first and second jaws, but prevent full closure of the stripping aperture.

18. The device of claim 17, wherein the handle portions of the first and second jaws are biased away from one another.

19. The device of claim 17, including a locking mechanism for selectively locking the handle and jaw portions adjacent to one another.

20. The device of claim 17, wherein the notches of the first and second jaws are disposed in different planes so that the notches cooperatively form a variable diameter stripping aperture.

* * * * *